United States Patent [19]

Sato et al.

[11] Patent Number: 4,484,224

[45] Date of Patent: Nov. 20, 1984

[54] PULSE GENERATING CIRCUIT FOR A TELEVISION CAMERA USING SOLID STATE IMAGE SENSOR

[75] Inventors: Kazuhiro Sato, Tokyo; Nobuo Murata, Komae; Kenji Takahashi, Kodaira; Shusaku Nagahara, Hachioji, all of Japan

[73] Assignees: Hitachi, Ltd.; Hitachi Denshi Kabushiki Kaisha, both of Tokyo, Japan

[21] Appl. No.: 374,871

[22] Filed: May 4, 1982

[30] Foreign Application Priority Data

May 6, 1981 [JP] Japan .................................. 56-66932

[51] Int. Cl.³ .................... H04N 3/14; H04N 5/04
[52] U.S. Cl. ............................. 358/213; 358/152
[58] Field of Search ............... 358/150, 212, 213, 152

[56] References Cited

U.S. PATENT DOCUMENTS 3,422,223  1/1969  Scipione ............................. 358/150

Primary Examiner—John C. Martin
Assistant Examiner—Victor R. Kostak
Attorney, Agent, or Firm—Antonelli, Terry & Wands

[57] ABSTRACT

Disclosed is a solid state television camera with solid state image sensor for converting an optical image into electrical signals, which is comprised of a pulse generator for generating a train of pulses with a frequency equal to the horizontal scanning frequency of a television system, a frequency divider for frequency-dividing the pulse train into a signal with a frequency substantially equal to the vertical scanning frequency alternately in two modes of 1/n and 1/n+1 (where n is a positive integer), and a selective circuitry for forming a train of pulses with a desired vertical scanning frequency on the basis of the pulse trains derived from the pulse generator and the frequency divider.

2 Claims, 13 Drawing Figures

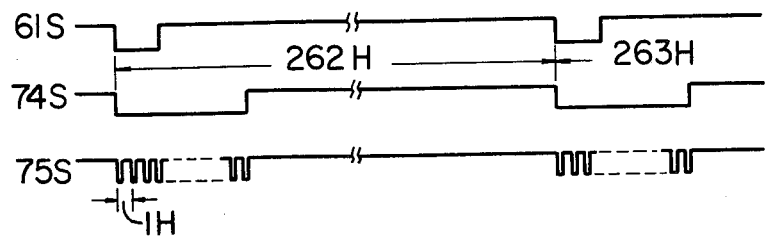
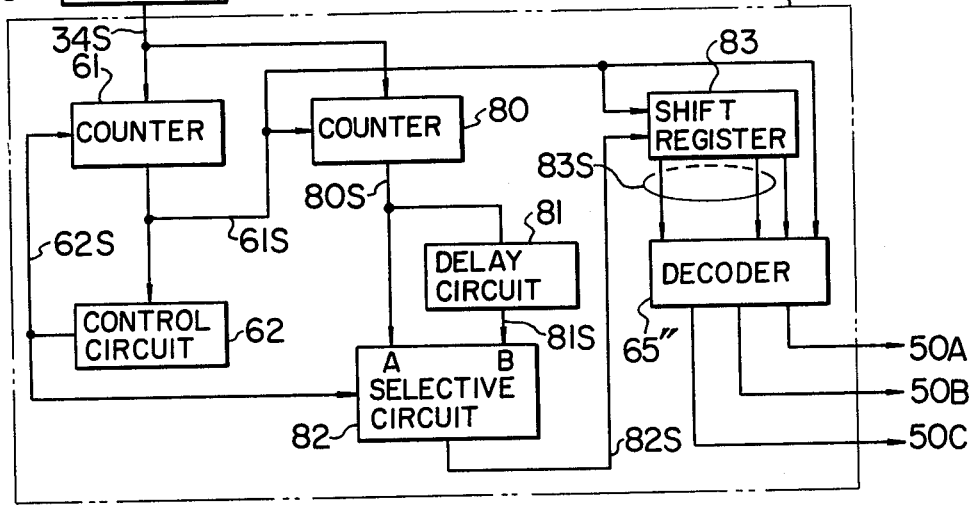
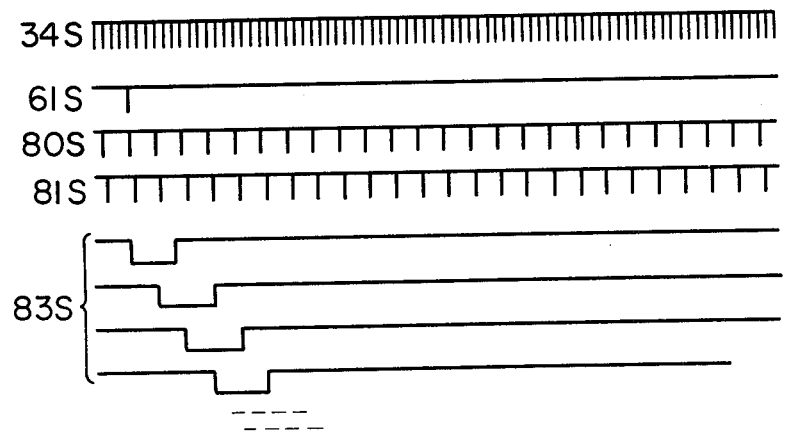

PULSE GENERATING CIRCUIT FOR A TELEVISION CAMERA USING SOLID STATE IMAGE SENSOR

The present invention relates to a pulse generating circuit for a television camera and, more particularly, to a pulse generating circuit for a television camera using a solid state image sensor.

The solid state image sensor, for example, MOS type solid state image sensor, is so arranged that signals derived from photo diodes arranged in a matrix fashion in a light receiving section are read out in a time sequential manner by sequentially switching MOS switches for vertical and horizontal reading signals.

In FIG. 1, reference numeral 1 designates photo diodes two-dimensionally arranged on an image pick-up surface; 2 lines for reading out signals provided for column lines in the matrix in a one-to-one correspondence manner; 3 switches for reading out vertical signals provided between the photo diodes 1 and the vertical signal read lines 2; 4 switches for reading out horizontal signals provided between the vertical signal read lines 2 and output lines 5; 6 a video output terminal; 7 a load resistor; 8 a video bias voltage source; 11 and 12 horizontal and vertical scanning circuit.

The horizontal scanning circuit 11 is made up of, for example, shift registers so arranged that horizontal input pulses $V_{sx}$ supplied for each horizontal scanning period are sequentially shifted by two-phase clocks $C_{PX}$ ($C_{PX1}$, $C_{PX2}$) to produce pulses on the output lines $O_{X(1)}$ to $O_{X(n)}$ at the respective stages. Likewise, the vertical scanning circuit 12 is made up of, for example, shift registers so arranged that vertical pulses $V_{SY}$ supplied every frame are shifted by 2-phase clocks $C_{PY2}$ ($C_{PY1}$, $C_{PY}$) to produce pulses on the output lines ($O_{Y(1)}$ to $O_{Y(m)}$).

The pulses $V_{OX(1)}$ to $V_{O(n)}$ appearing on the output lines $O_{X(1)}$ to $O_{X(n)}$ of the horizontal scanning circuit 11, and the pulse $V_{OY(1)}$ to $V_{OY(m)}$ appearing on the output lines $O_{Y(1)}$ to $O_{Y(m)}$ of the vertical scanning circuit 12 have waveforms, for example, as shown in FIG. 2. The read switches 4 and 3 are sequentially switched by the pulse trains $V_{OX(1)}, \ldots, V_{OX(n)}$ and $V_{OY(1)}, \ldots, V_{OY(m)}$ to read out the signals from the matrix array of the photo diodes 1, via the read lines 2 and the output line 5. The scanning circuits 11 and 12 may be made up of shift registers of the type which is driven by three- or four-phase clock pulses. The color camera is formed by combining the solid state image sensor and the color filter.

As described above, to operate the solid state image sensors, clock pulses are required, which have fixedly related frequencies and phases. In addition to such clock pulses, the blanking signals, and horizontal and vertical synchronizing signals are required in order to convert the output signals from the solid state image sensor into a television signal. In prior solid state image sensor according to the NTSC standard, a high frequency signal of 14.3818 MHz as a reference signal which is produced from a signal reference signal source, is properly processed through a frequency dividing circuit for frequency dividing the reference frequency signal, a counter circuit and a decoder circuit, to form the various types of signals.

The television camera using the solid state image sensor (referred to as a solid state television camera) involves a problem of the synchronising noise synchronous with the video output signal. The inventors of the present patent application discovered that the synchronizing noise originates from a pulse generating circuit including the frequency dividing circuit, the counter circuit, and the decoder, and proposed a pulse generating circuit having successfully solved such problem in Japanese Utility Model Kokai (Laid-open) No. 56270/81 (Application No. 138412/79) published on May 15, 1981.

In the pulse generating circuit, high frequency pulses are produced from an oscillating circuit and applied to a frequency dividing circuit where it is reduced up to a given low frequency signal. In this arrangement, pulsate noise generating in each stage of the frequency dividing circuit are coupled into output signal lines through power lines, an earth line or electrostatic coupling. Particularly, the noise pulses of the horizontal shift register appears as stripe noise on the screen. In the pulse generating circuit which has successfully solved this problem, the pulse at the horizontal sync frequency fH=15.734 KHz is generated by a first oscillator. The horizontal clock pulse applied to the horizontal scanning circuit for the solid state image sensors is generated by a second oscillator operating in synchronism with the horizontal sync pulse. The pulses for the horizontal scanning circuit is formed not using the frequency dividing circuit. In the vertical scanning circuit having no influence of the synchronous noise on the screen, the pulses of the given frequency are formed by using the frequency dividing circuit.

FIG. 3 shows a block diagram illustrating a leading part of a pulse generating circuit designed on the basis of the above-mentioned proposal. FIG. 4 shows a set of waveforms at the key portions of the circuit. Reference numeral 30 designates a first oscillator for generating a train of pulses 30S of the horizontal sync frequency fH=15.734 KHz. Reference numeral 31 designates a switch for selecting either an external sync signal HD or the output signal 30S of the first oscillator. The operation of the pulse generating circuit will be described. Assume that the switch 31 is set to the first oscillator. The pulses 30S of the horizontal frequency is inputted to a second oscillator 32 for generating the horizontal clock pulses 32S, a pulse width control circuit 33 and a horizontal blanking pulse generating circuit 34.

The clock pulse S produced from the second oscillator 32 and the clock pulses 37S obtained through the delay circuit 36 and the pulse control circuit 37, become two phase horizontal clock pulses $C_{PX1}$ and $C_{PX2}$ for driving the horizontal scanning circuit 11, respectively. The clock pulse 32S, together with the horizontal blanking pulse 34S produced from the horizontal blanking pulse generating circuit 34, is applied to a logical circuit 38 which in turn forms an input pulse $V_{SX}$ for the horizontal scanning circuit 11.

The output pulse 33S of a pulse width control circuit 33, together with the horizontal sync pulse 30S, is applied to the logic circuit 39 which in turn produces a horizontal sync signal 39S. The horizontal sync signal 39S and the horizontal blanking pulse 34S are used as two phase clock pulses $C_{PY1}$ and $C_{PY2}$ for driving the vertical scanning circuit 12, respectively.

The horizontal blanking pulse 34S is applied to a video sync pulse generating circuit 50 made up of a counter 51 and a logic circuit 52. In the video sync pulse generating circuit 50, the output pulses from a counter 51 are properly combined by a logic circuit 52 to form a vertical blanking pulse T1 with a pulse width T1 ranging from 19 to 22 H periods (where H designates one horizontal scanning period), a vertical sync pulse 50B with a pulse width T2 of 3 H, and an output pulse 50C with a given pulse width in synchronism with the blanking pulse 50A. The vertical blanking pulse 50A, together with the horizontal blanking pulse 34S, is inputted to a logic circuit 40 which produces a composite blanking signal CB. The vertical sync pulse 50B, together with the horizontal sync signal 39S, is applied to the logic circuit 41 which in turn forms a composite sync signal CS. The pulse 50C is used as an input pulse $V_{SY}$ to the vertical scanning circuit 12. A switch 32 used for externally applying the sync signal is used for resetting the counter 51 by an external sync pulse VD.

The circuit arrangement shown in FIG. 3 does not contain the high frequency oscillator and the counter circuit for frequency-dividing the output signal from the oscillator. This feature provides an advantage that the synchronous noise can be removed from the output signal from the solid state image sensors, but provides a disadvantage that the interlacing scanning is impossible for improving the resolution.

The interlace scanning means that the scanning is shifted by one horizontal scanning line between the odd field and the even field to substantially improve the resolution. To realize this, as shown in FIG. 5, the vertical sync pulse is generated at the period of 262.5 H. The phase of the horizontal sync signal 39S is shifted with respect to that of the vertical sync pulse 50B by ½ H every field. In the pulse generating circuit for the ordinary television system, the high frequency pulses of 14.31818 MHz is first frequency-divided into 1/455 frequency, i.e. 31.469 KHz double the horizontal scanning frequency. The frequency is further divided into ½ and 1/525 as 15.734 KHz and 60 Hz, respectively. The phase relation shown in FIG. 5 could easily be realized using the 31.469 KHz signal. In the pulse generating circuit shown in FIG. 3, however, the signal of 31.469 KHz is not contained. For this reason, the circuit shown in FIG. 3 can not employ the conventional interlace scanning system.

Accordingly, an object of the present invention is to provide a pulse generating circuit for a solid state camera which can produce interlace scanning pulses even when the signal with a frequency two times the horizontal scanning frequency is not present.

To achieve the above object, there is provided a pulse generating circuit comprising: a first means for generating a train of pulses with the horizontal scanning frequency for the television, a second means for frequency-dividing the output pulse from the first means into 1/n and 1/(n+1) (where n is a positive integer) to form a train of pulses with a frequency substantially equal to that of the vertical scanning frequency, and a third means for producing a train of pulses with a given vertical scanning frequency from the output pulse trains from the first and second means.

The present invention will be apparent from the following detailed description taken in conjuction with the accompanying drawings, in which:

FIG. 11 shows a set of waveforms with an assist in explaining the operation of the second embodiment;

FIG. 12 is a block diagram of a third embodiment of a pulse generating circuit according to the present invention; and FIG. 13 shows a set of waveforms with an assist in explaining the operation of the third embodiment according to the present invention.

The present invention will be described using embodiments illustrated in referring to the accompanying drawings.

Figure 1:
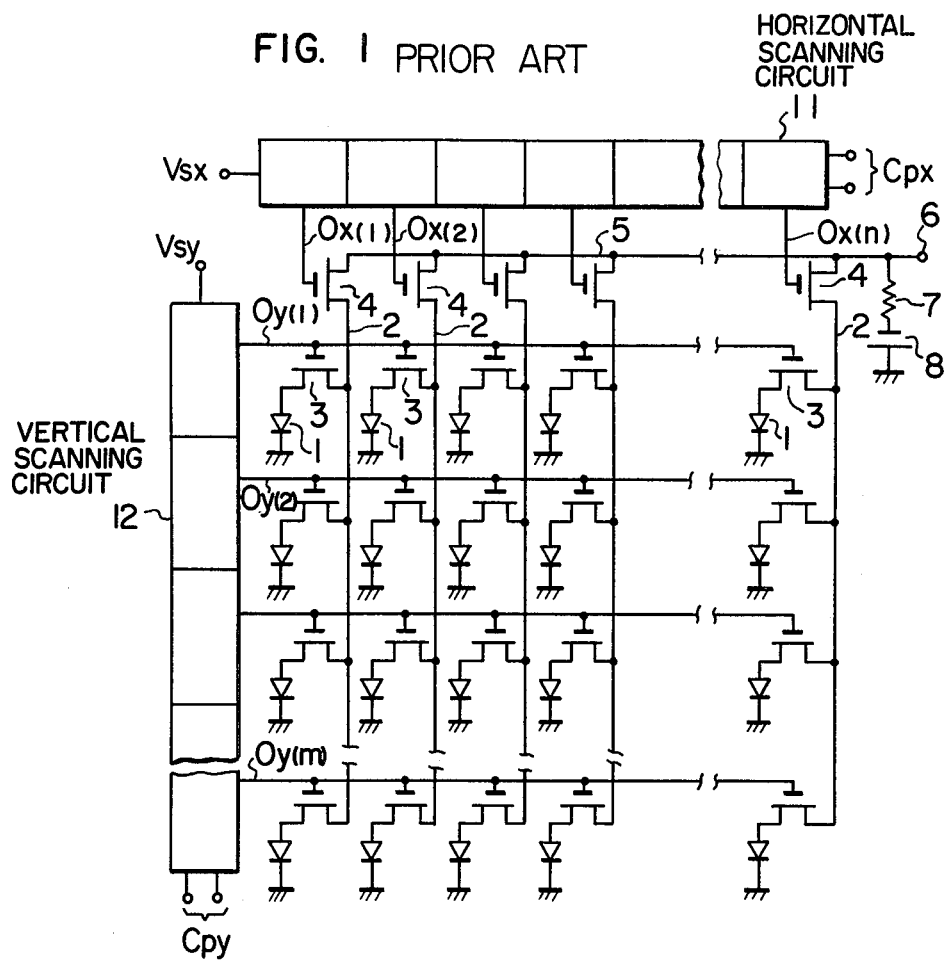
FIG. 1 shows an example of a schematic diagram of a MOS type solid state image sensor.
Figure 2:
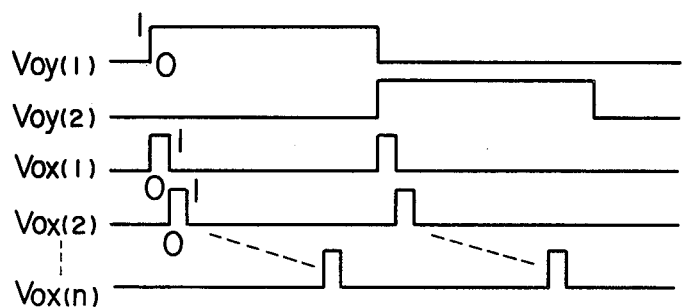
FIG. 2 shows a set of waveforms of vertical and horizontal scanning pulses for operating the image sensor.
Figure 3:
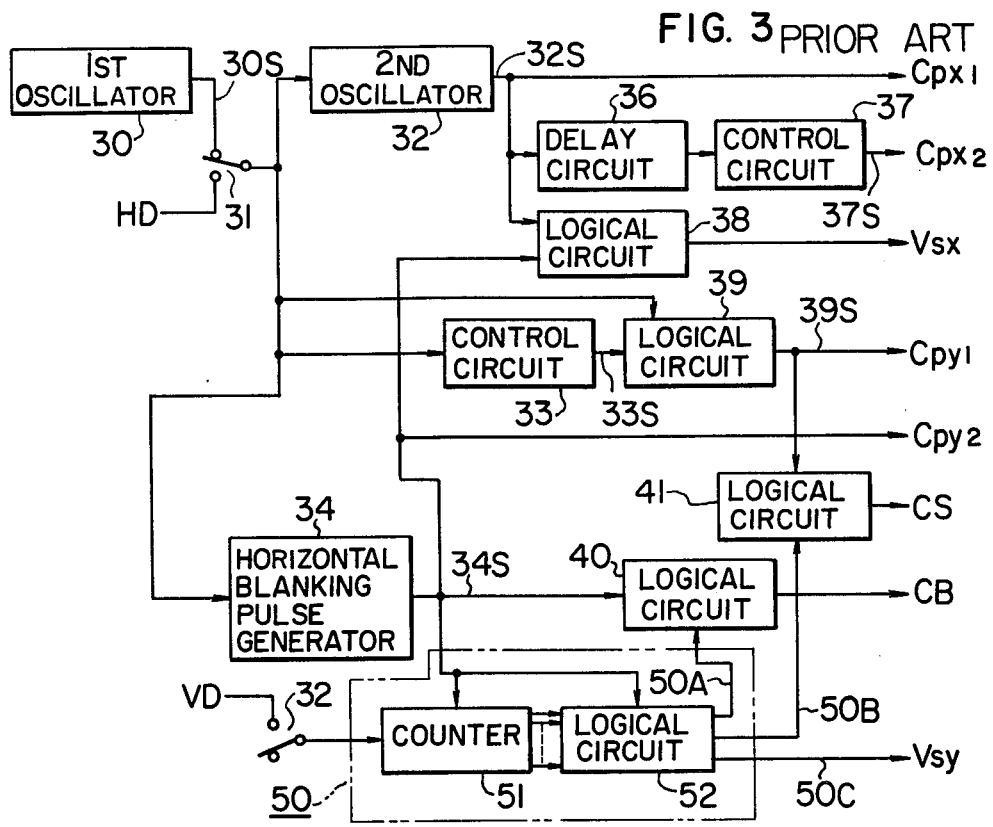
FIG. 3 is a block diagram of a drive pulse generating circuit for the solid state camera previously proposed by the inventors of the present patent application.
Figure 4:
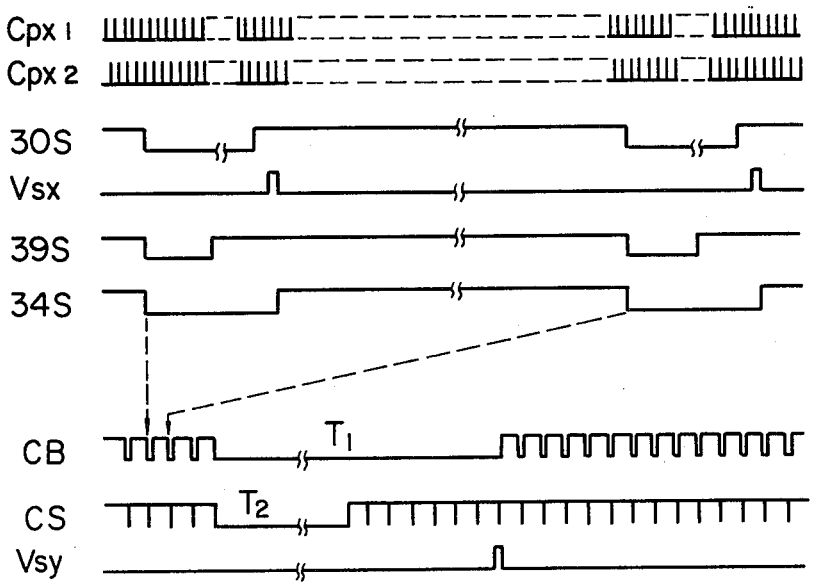
FIG. 4 shows a set of waveforms in the circuit of FIG. 3.
Figure 6:
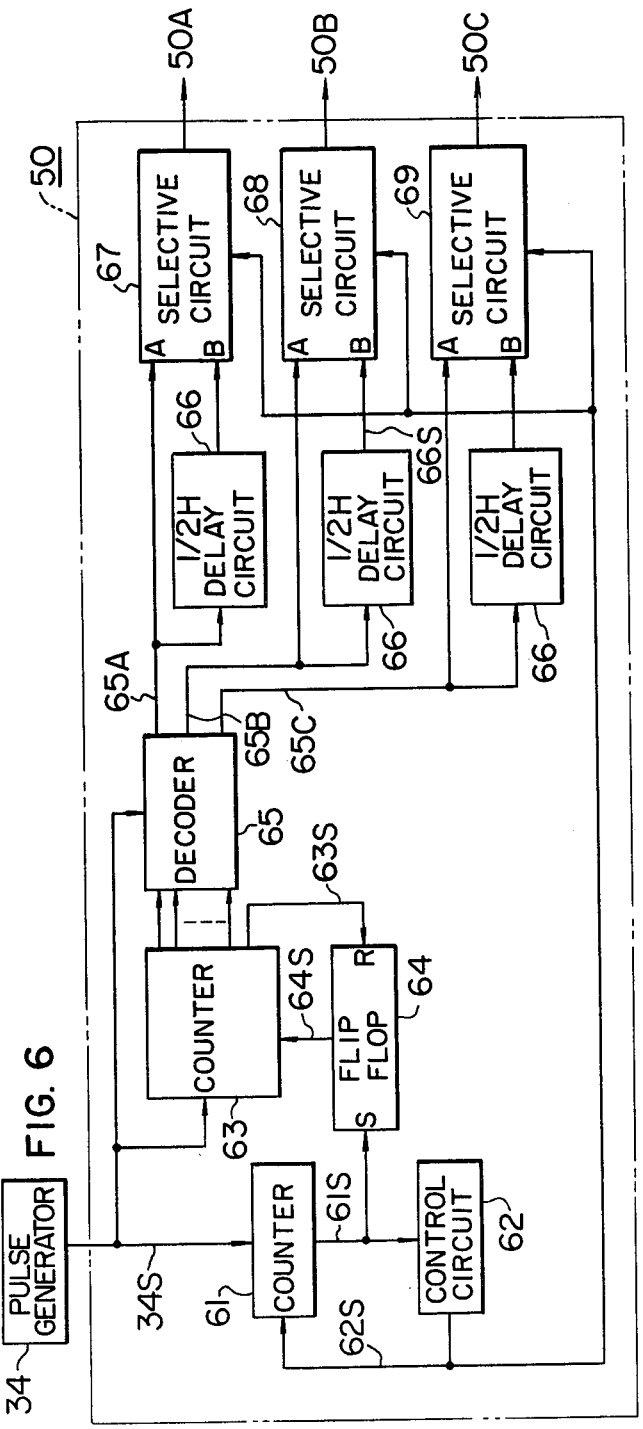
FIG. 6 is a block diagram of a leading part of a first embodiment of a drive pulse generating circuit according to the present invention.

FIG. 6 shows a first embodiment of a circuit according to the present invention which is usable in place of the video sync pulse generating circuit 50 shown in FIG. 3. In the figure, reference numeral 61 shows a counter for frequency-dividing the horizontal blanking pulse 34S. The counter 61 has first and second frequency-dividing modes. The counter counts the input pulse in either of the two frequency-dividing modes specified by a control signal 62S produced from a control circuit 62 and produces pulses 61S every time the input pulse reaches a given value. In the first frequency-dividing mode, the output pulse 61S is generated every 262 pulses. In the second frequency-dividing mode, the output pulse is produced every 263 pulses. The control circuit 62 is, for example, a flip-flop circuit inverting its state responsive to the output pulse 61S from the counter. Accordingly, the control signal 62S inverts its state every time the counter 61 produces the pulse 61S. In response to the control signal, the counter 61 alternately repeats the first and second frequency-dividing modes. A counter 63 starts its counting operation of the pulse 34S in response to the set output signal of the flip-flop 64, and produces output pulses 63S. The flip-flop 64 is set by the output pulse 61S and reset by the output pulse 63S from the counter 63. With this arrangement, the counter 63 starts its counting operation every 262 or 263 of the horizontal blanking pulses 34S, and stops the count after a lapse of time corresponding to the vertial blanking period T1 (=22H).

A decoder circuit 65 forms vertical blanking pulses 65A, vertical sync pulses 65B and vertical input pulses 65C on the basis of the output signals from the counter 63. As previously stated, the period of the count operation of the counter 63 is determined by the frequency dividing mode of the counter 61. The output pulses 65A to 65C from the decoder 65 are produced with two alternate periods of 262H and 263H, as indicated by the waveform 65B in FIG. 7, for example.

Figure 5:
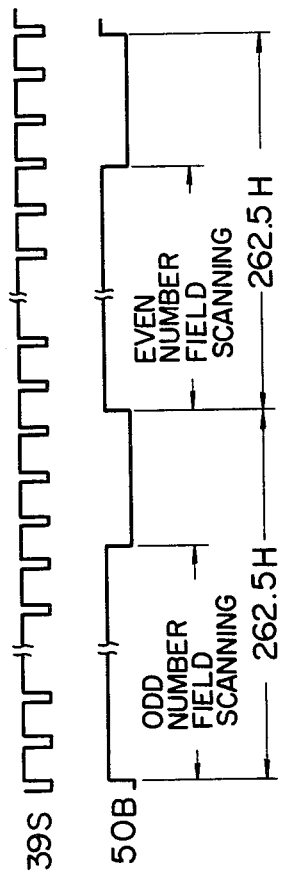
FIG. 5 shows a set of waveforms useful in explaining a relationship between horizontal and vertical sync signals necessary for the interlace scanning.
Figure 7:
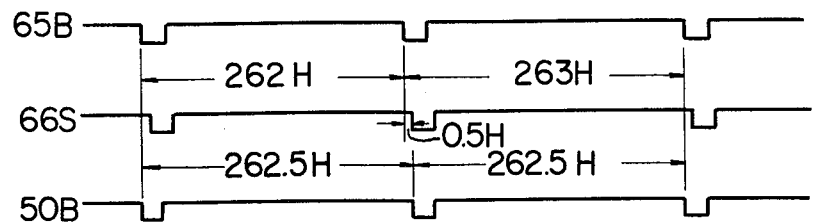
FIG. 7 shows a set of waveforms useful in explaining the operation of the first embodiment.

Reference numerals 66 designate signal delay circuits with a signal delay time of ½H inserted in respective output circuits; 67 to 69 are selective circuits with input terminals A coupled with the decoder output signals 65A to 65C and with input terminals B coupled with the output signals from the delay circuits. These selective circuits are under control of the output signal 62S of the control circuit 62 and each select alternately either of the input signals A and B to produce output signals 50A to 50C. With this circuit construction, for example, in the case of the circuit for the vertical sync pulse 50B, the output pulse 65B of the decoder, the output pulse 66S of the delay circuit, and the output pulse 50B from the selective circuit are as shown in FIG. 7. As seen from the figure, the vertical sync pulse with the repetition period of 262.5 H necessary for the interlace is obtained, as shown in FIG. 5.

In the circuit shown in FIG. 6, the signal delay circuit 66 may be a delay line including an inductor and a capacitor or a glass type delay circuit using ultrasonic waves. Additionally, a charge coupled element such as a CCD (charge coupled device) recently developed or a digital circuit shown in FIG. 8 or 9 may be used for the delay circuit.

Figure 8:
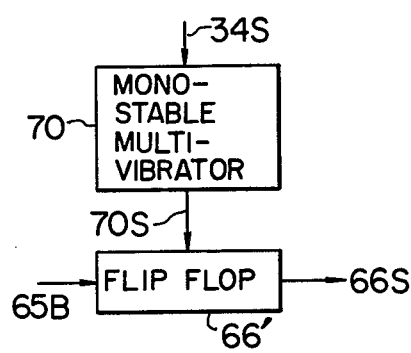
FIGS. 8 and 9 show block diagrams for illustrating arrangements of the delay circuit in the circuit shown in FIG. 6.

In FIG. 8, reference numeral 70 designates a circuit containing a monostable multivibrator, which produces pulses 70S delayed ½ horizontal scanning time behind the horizontal blanking pulse 34S (or any other suitable pulse if it has the horizontal scanning pulse, for example, the horizontal period signal). By this pulse 70S, the flip-flop circuit 66' of the D type is triggered to delay the pulse appearing the input terminal D of the D type flip-flop such as the pulse 65B, by the ½ horizontal scanning time. The monostable multivibrator 70 is also used for each of the flip-flops 66' for the pulses 65A to 65C.

Figure 9:
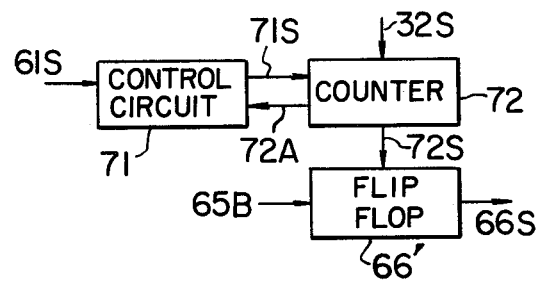

Turning now to FIG. 9, there is shown another embodiment of the circuit for delaying the pulse. In the circuit, a counter 72 counts high requency pulses 32S such as horizontal clock pulses within the vertical blanking period providing no hindrance to picture to form pulses with the ½ horizontal scanning period (approximately 31.5 KHz). The pulse 72S formed operates a D type flip-flop 66' to delay the pulses inputted. In the figure, the circuit 71, provided for controlling the operation of the counter 72, responds to the output pulse 61S of the counter 61 to produce output pulses 71S. Responsive to the signal 71S, the counter 72 counts during a period corresponding to approximately 22 horizontal scanning periods (or 18 to 24 horizontal scanning periods), thereby to produce trigger pulses 72S.

The control circuit 71 receives the counter output signal 72A produced at a time point that the 22 horizontal scanning periods elapse and stops the operating signal 71S.

Figure 10:
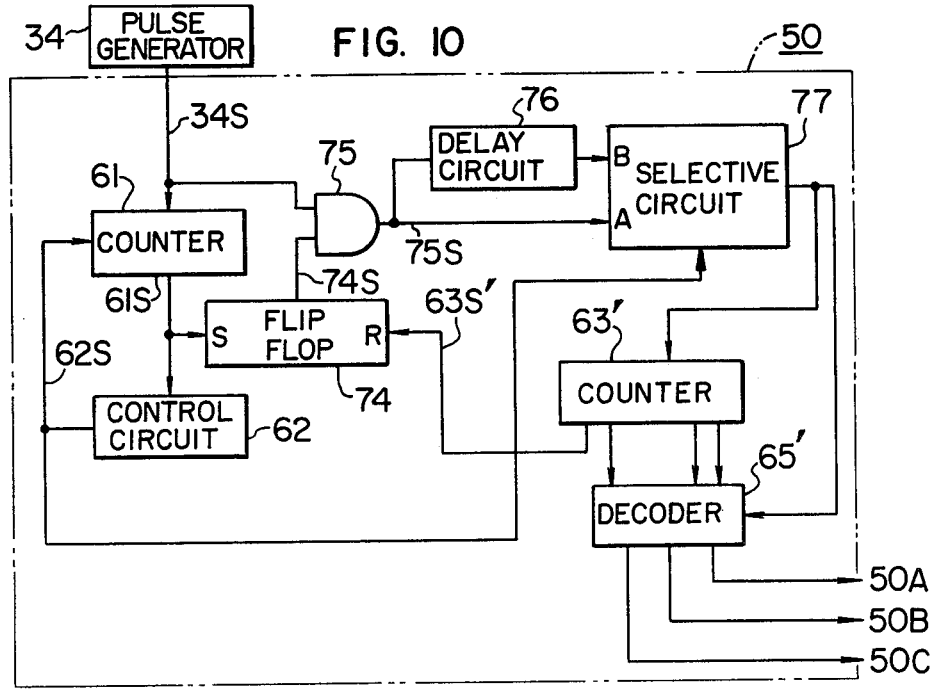
FIG. 10 shows a block diagram of a second embodiment of a pulse generating circuit according to the present invention.

FIG. 10 shows a second embodiment of a pulse generating circuit according to the present invention which can be used for the video sync pulse generating circuit shown in FIG. 3. Signal waveforms are observed at the key portions in the circuit of FIG. 10. The first embodiment needs a plurality of delay circuits and a plurality of selective circuits, as described above. The second embodiment is designed aiming at reducing the number of these delay and selective circuits. In FIG. 10, the counter 61 and the control circuit 62 are constructed as in the first embodiment. The counter 61 produces pulses 61S having alternately the periods of 262 H and 263 H, as shown in FIG. 11. Reference numeral 74 designates a flip-flop which is set by the counter output signal 61S and is reset by the output signal 63S' of the counter circuit 63'. Reference numeral 74 designates an AND circuit to allow the horizontal blanking pulse 34S to pass therethrough during a period that the output pulse 75S of the flip-flop 74 is "1" (in the drawing, a negative logic is applied for it). The counter 63' produces a reset pulse 63S' for the flip-flop 74 when it counts a given number of pulses corresponding to the vertical blanking period, for example, 22 horizontal scanning periods. Accordingly, the output signal 75S of the AND circuit 75 has 22 horizontal blanking pulses having alternately repetition periods of 262H and 263H, as shown in FIG. 11. A selective circuit 77, which is controlled by a control signal 62S, is coupled at the terminal A with the output signal 75S from the AND circuit 75 and at the terminal B with the output signal from the same AND circuit delayed ½H time by a delay circuit 76. The selective circuit alternately selects these signals to form a train of pulses of 262.5 H period. A counter 63' counts the pulse train and supplies the counted ones to a decoder 65'. In this way, the decoder produces the vertical blanking pulse 50A of the 262.5H period, the vertical sync pulse 50B and the vertical input pulse 50C, which satisfy the interlace condition.

Turning now to FIG. 12, there is shown another embodiment of a pulse generating circuit according to the present invention. A major feature of the present embodiment resides in that pulses 61S with the vertical scanning period are formed by using the counter circuit 61 and the control circuit 62, which operate like those of the first embodiment, and desired pulses are formed by a combination of a shift register with parallel outputs and a decoder circuit 65'' on the basis of the pulses 61S.

Also in the present embodiment, the pulses with 262 horizontal scanning periods must be delayed ½ horizontal scanning time. To this end, the present embodiment delays shift clock pulses 82S applied to the shift register 83 by ½ horizontal scanning time. In FIG. 12, the circuits 80 to 82 make up a circuit for forming clock pulses applied to the shift register 83. The circuit 80 is a counter circuit which frequency-divides horizontal blanking pulses 34S shown in FIG. 13 (or any other pulses with the horizontal scanning period) into ½. The circuit 81 is a delay circuit which delays the output pulses 80S from the counter 80 by the ½ horizontal scanning time, thereby forming pulses 81S. The circuit 82 alternately selects the two trains of pulses 80S and 81S according to the control signal 62S. The counter 80 is reset every 262 and 263 horizontal scanning periods in response to the sync pulse 61S of the counter 61, so that the output pulses from both the counters are timed.

The pulse train denoted as 83S in FIG. 13 are applied to the output terminal of each stage of the shift register 83. The decoder circuit 65'' combines these pulses to form the vertical blanking pulses 50A, the vertical sync pulses 50B and the vertical input pulses 50C.

As seen from the foregoing, the pulse generating circuit according to the present invention can produce the pulses necessary for the solid state television camera having no adverse influence of the S/N of the television signal. Further, the pulse generating circuit can produce the interlace scanning pulses even if the frequency two times the horizontal frequency is not present. While the pulse generating circuit for the MOS type solid state image sensor has been used in the above-mentioned embodiments, the pulse generating circuit according to the present invention is applicable for a CCD solid state image sensor of the charge transfer type in which a picture signal is transferred with the vertical scanning period (corresponding to 60 Hz for the NTSC system and 50 Hz for the PAL system) and the horizontal scanning period (corresponding to about 15.75 KHz for the NTSC system and 15.625 KHz for the PAL system), or for the image sensor of the CID (charge injection device) and CPD (charge priming device) type.

We claim:

1. A solid state television camera with solid state image sensor for converting an optical image into electrical signals, comprising:
    a pulse generator for generating a train of pulses with a frequency equal to the horizontal scanning frequency of a television system;
    a frequency divider for frequency-dividing the pulse train into a signal with a frequency substantially equal to the vertical scanning frequency alternately in two modes of 1/n and 1/n+1 (where n is a positive integer); and
    a selective circuitry for forming a train of pulses with a desired vertical scanning frequency on the basis of the pulse trains derived from said pulse generator and said frequency divider, said selective circuitry including gate means for allowing the output pulses from said pulse generator to pass therethrough for a given time according to the output pulses from said frequency divider, a delay circuit for delaying the output signal from said gate means by a ½ horizontal scanning time, and means for alternatively selecting the output signals delivered from said gate means and said delay circuit in accordance with the output of said frequency divider.

2. A solid state television camera with solid state image sensor for converting an optical image into electrical signals, comprising:
    a pulse generator for generating a train of pulses with a frequency equal to the horizontal scanning frequency of a television system;
    a frequency divider for frequency-dividing the pulse train into a signal with a frequency substantially equal to the vertical scanning frequency alternately in two modes of 1/n and 1/n+1 (where n is a positive integer); and
    a selective circuit for forming a train of pulses with a desired vertical scanning frequency on the basis of the pulse trains derived from said pulse generator and said frequency divider, said selective circuitry including a circuit for processing the output pulses from said pulse generator, a shift register for shifting the output pulses from said frequency divider in synchronism with the output pulses from said processing circuit, and a decoder for forming pulses with a given pulse width on the basis of the output pulses from said shift register.

* * * * *